(12) United States Patent
Talagala et al.

(10) Patent No.: US 6,789,162 B1
(45) Date of Patent: Sep. 7, 2004

(54) STORAGE CONTROLLER CONFIGURED TO SELECT UNUSED REGIONS OF A STORAGE DEVICE FOR DATA STORAGE ACCORDING TO HEAD POSITION

(75) Inventors: Nisha D. Talagala, Fremont, CA (US); Chia Y. Wu, Newark, CA (US); Whay S. Lee, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 595 days.

(21) Appl. No.: 09/690,599

(22) Filed: Oct. 17, 2000

(51) Int. Cl.$^7$ .............................................. G06F 12/00
(52) U.S. Cl. ........................ 711/112; 711/4; 711/111; 711/114; 711/165; 711/167; 711/170; 710/1; 710/205; 710/206; 707/1
(58) Field of Search .......................... 711/4, 111, 112, 711/114, 165, 167, 170, 202; 707/1, 205, 206; 710/1

(56) References Cited

U.S. PATENT DOCUMENTS 5,345,575 A * 9/1994 English et al. .............. 711/112
5,708,793 A * 1/1998 Franaszek et al. .......... 711/112

OTHER PUBLICATIONS

English et al., Loge: a self-organizing disk controller—1992, Proceeding of USENIX Winter 1992 Technical Conference, pp 237 251.*

* cited by examiner

Primary Examiner—Nasser Moazzami
Assistant Examiner—Bao Q. Truong
(74) Attorney, Agent, or Firm—Robert C. Kowert; Meyertons, Hood, Kivlin, Kowert & Goetzel, P.C.

(57) ABSTRACT

A storage device controller configured for coupling to a storage device (e.g., a hard disk drive) having a multiple locations for storing data. The controller is coupled to receive a WRITE ANYWHERE command including write data. Unlike a conventional write command, the WRITE ANYWHERE command does not specify a location of the storage device where the write data is to be stored. The controller responds to the WRITE ANYWHERE command by: (i) selecting one or more unused locations of the storage device, and (ii) writing the write data to the storage device, wherein the writing of the write data includes directing the storage device to store the write data in the one or more unused locations of the storage device. At least a portion of the write data in stored in each of the one or more unused locations. The controller may be coupled to receive the WRITE ANYWHERE command from a host configured to track usage of the locations of the storage device. After writing the write data to the storage device, the controller may report the one or more locations of the storage device where the write data is stored to the host. The host may also issue FREE commands to the controller specifying locations of the storage device which should be identified as unused. In response to a received FREE command, the controller may store information in a memory indicating that the location of the storage device specified by the FREE command is unused.

28 Claims, 7 Drawing Sheets

STORAGE CONTROLLER CONFIGURED TO SELECT UNUSED REGIONS OF A STORAGE DEVICE FOR DATA STORAGE ACCORDING TO HEAD POSITION

BACKGROUND OF THE INVENTION

1. Field of the Invention

This invention relates to computer data storage systems, and more particularly to data storage systems including mass storage devices such as hard disk drives.

2. Description of the Related Art

A typical computer system includes one or more hard disk drives (i.e., disk drives) for storing data. The disk drive(s) form non-volatile memory of the computer system; data stored within the disk drive(s) remains persistent even in the absence of applied electrical power. FIG. 1 is a diagram illustrating logical relationships between a file system layer 10, a drive controller layer 12, and disk drive(s) 14 of the typical computer system. Disk drive(s) 14 typically stores data in "block" locations of disk drive(s) 14. Each block location includes one or more contiguous sectors, where a sector is the smallest disk storage unit. File system layer 10 manages the usage of the block locations, and maintains information as to whether each block location is: (i) currently used to store data (i.e., is "in use"), or (ii) not currently used to store data (i.e., is "available" or "free"). File system layer 10 may include, for example, file system software of an operating system.

A typical disk drive includes multiple, disk-shaped platters coated with a layer of a magnetic material, and an equal number of pairs of read/write heads (i.e., "heads"). The heads transform electrical signals to magnetic signals during write operations, and transform magnetic signals to electrical signals during read operations. Each head is attached to an end of an arm, and positioned adjacent to a surface of one of the platters. The arms are connected together such that they move in unison. During operation of the disk drive, the platter is rotated about an axis, and the connected arms are moved to properly position the heads. The platters are divided into multiple tracks arranged as concentric rings. Corresponding tracks on the surfaces of the platters define different cylinders of the disk drive, and each track is divided into sectors.

During a typical write operation, file system layer 10 determines one or more "free" block locations of disk drive(s) 14 where data may be written (i.e., stored), and issues a write command to drive controller layer 12. The write command includes the data and specifies the one or more "free" block locations of disk drive(s) 14 where the write data is to be stored. The specified one or more "free" block locations of disk drive(s) 14 where the write data is to be stored may be translated to drive, cylinder, head, and/or sector information of disk drive(s) 14. Drive controller layer 12 translates the write command according to an interface standard, and conveys the translated write command to disk drive(s) 14. In response to the write command, disk drive(s) 14 stores the data in the "free" block locations specified by the write command. In addition, file system layer 10 updates its block location usage information to reflect that the block locations of disk drive(s) 14 have been transitioned from "free" to "in use".

During a typical read operation to retrieve stored data from disk drive(s) 14, file system layer 10 determines the one or more block locations of disk drive(s) 14 where the desired data is stored, and issues a read command to drive controller layer 12 specifying the one or more block locations. The specified one or more block locations of disk drive(s) 14 where the desired data is stored may be translated to drive, cylinder, head, and/or sector information of disk drive(s) 14. Drive controller layer 12 translates the read command according to the interface standard, and conveys the translated read command to disk drive(s) 14. In response to the read command, disk drive(s) 14 reads the data from the block locations specified by the read command, and provides the data to drive controller layer 12. Drive controller layer 12 in turn provides the read data to file system layer 10.

In order to access a different cylinder of the disk drive, a mechanical movement of the arms must occur. Such mechanical movements require relatively long periods of time. Also, even when the head is at the correct cylinder/head, a rotational delay is incurred for the disk to rotate until the correct location is under the head. As a result, the above describe typical write and read operations create several performance issues for the typical computer system. To minimize the mechanical and rotational delays, it would be desirable for writes to occur to a free block location as close to the current head position as possible. For the file system to attempt to perform writes near the current head position, file system layer 10 may need to know: (i) the internal "geometry" of disk drive(s) 14 (i.e., the number of cylinders, heads, and sectors of disk drive(s) 14), and (ii) the current position of the heads of disk drive(s) 14. Although head position estimation algorithms exist, delays between disk drive(s) 14 and file system layer 10 make it difficult to determine head position accurately. As file system layer 10 cannot accurately predict which "free" block locations are near one or more heads of disk drive(s) 14 at any given time, write operations may not be as efficient as desired. As file systems become even further removed from the disk drives, such as in storage area networks (SANs), the latencies between the file system layer and the drives may increase making drive head location prediction even more difficult. In addition, where disk drive(s) 14 includes multiple disk drives, the burden of tracking the current head position of all the disk drives may present a significant amount of overhead for file system layer 10.

It would thus be desirable to have a computer system wherein decisions as to where data should be stored in a disk drive are made such that write operation efficiencies are improved.

SUMMARY OF THE INVENTION

A described storage device controller is configured for coupling to a storage device (e.g., a hard disk drive) having a multiple locations for storing data. The controller is coupled to receive a WRITE ANYWHERE command including write data. Unlike a conventional write command, the WRITE ANYWHERE command does not specify a location of the storage device where the write data is to be stored. The controller responds to the WRITE ANYWHERE command by: (i) selecting one or more unused locations of the storage device, and (ii) writing the write data to the storage device, wherein the writing of the write data includes directing the storage device to store the write data in the one or more unused locations of the storage device. At least a portion of the write data is stored in each of the one or more unused locations. The controller may be coupled to receive the WRITE ANYWHERE command from a host configured to track usage of the locations of the storage device. After writing the write data to the storage device, the controller may report the one or more locations of the storage device where the write data is stored to the host.

The storage device may include one or more surfaces configured to store data. The surfaces may be divided into different regions, forming the multiple locations. The controller may include a memory for storing data indicating unused locations of the storage device, and the controller may select the unused location of the storage device from the data indicating unused locations of the storage device.

In addition to the WRITE ANYWHERE command, the host may issue FREE commands to the controller specifying locations of the storage device which should be identified as unused. In response to a received FREE command, the controller may add information to the memory indicating that the location of the storage device specified by the FREE command is unused.

Several described embodiments of an apparatus (e.g., a computer system) include the above described storage device and the above described controller coupled to the storage device. The storage device may be, for example, a disk drive including a disk-shaped platter having a surface configured to store data. The surface may be divided into multiple regions. The controller may include a memory for storing data indicating unused regions of the surface of the platter. A WRITE ANYWHERE command received by the controller includes write data, but does not specify a region of the surface of the platter where the write data is to be stored. The controller responds to the WRITE ANYWHERE command by: (i) selecting one or more unused regions of the surface of the platter from the data indicating unused regions of the surface of the platter, and (ii) writing the write data to the disk drive, wherein the writing of the write data includes directing the disk drive to store the write data in the one or more selected unused regions of the surface of the platter.

The platter may be rotated about an axis during operation of the disk drive. As is typical, the disk drive may include a read/write head positioned adjacent to the surface of the platter, wherein the read/write head is used to store data within the surface and to retrieve stored data from the surface. The controller may maintain information regarding a current position of the read/write head with respect to the rotating platter (e.g., based upon previous commands issued to the disk drive). Alternately, the disk drive may provide head position information to the controller indicating the current position of the read/write head with respect to the rotating platter. In either situation, the controller may be configured to select the unused region of the surface from the data indicating unused regions of the surface dependent upon the current position of the read/write head with respect to the rotating platter.

As is typical, the surface of the platter may be divided into a multiple tracks arranged as concentric rings, wherein each track is divided into a multiple sectors. The multiple regions of the surface of the platter may include multiple data regions. Each track may include a portion of the data regions. Each data region may include multiple disk blocks, wherein each disk block includes one or more sectors.

In some embodiments, the multiple regions of the surface of the platter also include multiple map regions, wherein each map region includes a disk map corresponding to a different one of the data regions. A given disk map may be located on the same track as the corresponding data region. Each disk map includes information indicating whether each disk block of the corresponding data region is used or unused. The map regions may be located within data regions.

The selected unused regions of the surface specified in the writing of the write data may include one or more unused disk blocks. A data region including one of the unused disk blocks and the corresponding disk map may both be written during the same rotation of the platter. To facilitate the writing of the data region and the corresponding disk map during the same rotation of the platter, each data region may be positioned a fixed offset distance rotationally ahead of the corresponding disk map. The controller may write the data region and the corresponding disk map via back-to-back writes to the disk drive, and wherein the fixed offset distance is selected dependent upon an amount of time required for the controller to issue, and the disk drive to execute, the back-to-back writes to the disk drive.

The memory of the controller may include a map cache for storing copies of a portion of the disk maps stored on the surface of the platter. The controller may use the copies of the disk maps stored in the map cache to select the unused region of the surface of the platter. The map cache may include copies of the disk maps on a track of the surface of the platter adjacent to which the read/write head is currently positioned (i.e., maps on a current track). The map cache may also include copies of disk maps on tracks near the current track.

The memory of the controller may include a non-volatile memory for storing updated versions of a portion of the disk maps stored on the surface of the platter. After writing the write data to the storage device, the controller may update the disk map corresponding to the data region including the unused disk block, and store the updated version of the disk map in the non-volatile memory. At some later time, the controller may write the updated versions of the disk maps stored within the non-volatile memory to the disk drive.

The memory of the controller may include a non-volatile memory for storing disk maps corresponding to all of the data regions on the surface of the platter. After writing the write data to the storage device, the controller may simply update the disk map corresponding to the data region including the unused disk block within the non-volatile memory.

The above described apparatus may include the above described host coupled to the controller. As described above, the host tracks usage of the regions for storing data of the disk drive. For example, the host may include a central processing unit coupled to a memory and configured to execute instructions stored within the memory, and file system software within the memory comprising instructions for tracking usage of the regions for storing data of the disk drive.

One embodiment of a method for writing data to a disk drive includes a drive controller receiving a file system command specifying data to be written to the disk drive but not specifying a location to write the data. The drive controller determines a current head position of the disk drive, and selects a free location of the disk drive to write the specified data depending on the current head position. The drive controller writes the specified data to the selected location. The drive controller updates a map of free locations to indicate that the selected location is no longer free. The drive controller reports to the file system the selected location at which the specified data was written.

The map of free locations may indicate which locations on the disk drive are free for storing data. The selecting of the free location may include the drive controller selecting the free location nearest the current head position of the disk drive with time to write the specified data.

The method may further include the drive controller caching in a cache memory a portion of the map of free locations for locations proximate the current head position. The selecting may include accessing the cache memory according to the current head position to locate the free location nearest the current head position with time to write the specified data.

The map of free locations may be distributed into map portions residing on multiple tracks of the disk drive. Each map portion may correspond to a data region residing on the same track. Each map portion may be offset from the corresponding data region so that the map portion can be written in the same disk rotation as the corresponding data region. The updating may include updating the map portion for the data region in which the selected location is located.

The updating may also include the drive controller updating a portion of the map of free locations in a non-volatile memory. The non-volatile memory may be configured to store portions of the map of free locations. The method may further include writing updated map entries in the non-volatile memory to the disk drive when the disk drive is idle or when the non-volatile memory is full. The map of free locations for the entire disk drive is stored in the non-volatile memory.

Figure 1:
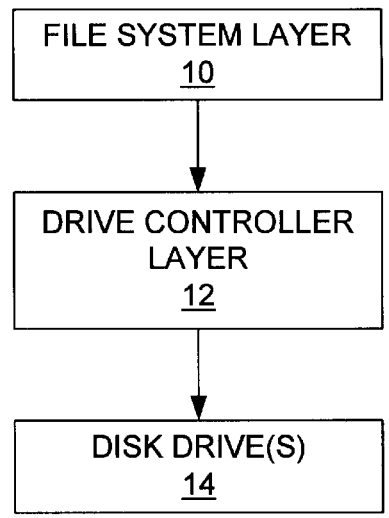
FIG. 1 is a diagram illustrating logical relationships between a file system layer, a drive controller layer, and disk drive(s) of a typical computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
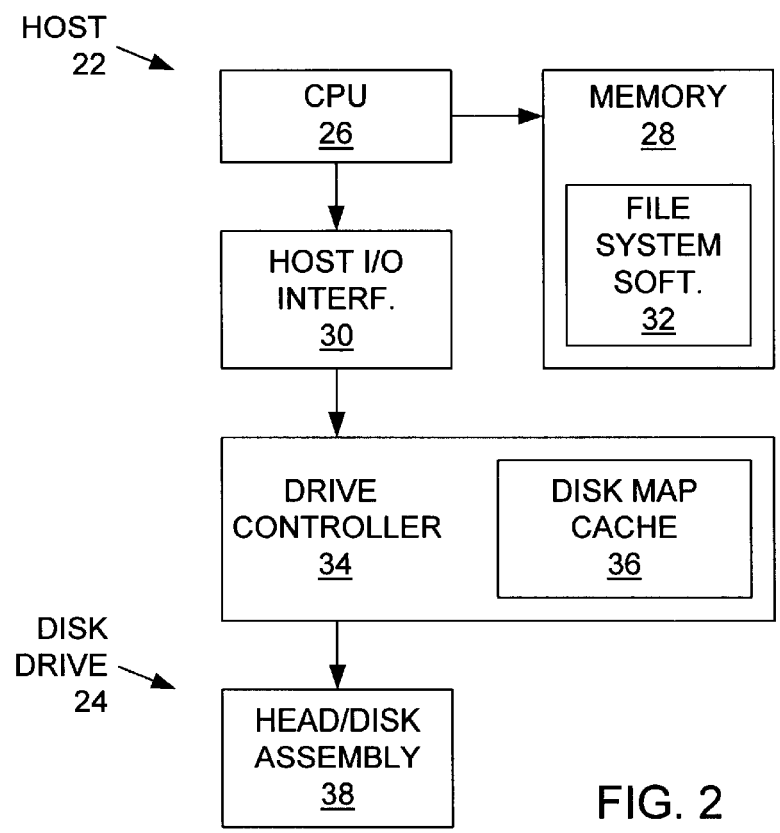
FIG. 2 is a diagram of one embodiment of a system including a host, a disk drive including a head/disk assembly, and a drive controller coupled between the host and the head/disk assembly of the disk drive.

FIG. 2 is a diagram of one embodiment of a system including a host 22 coupled to a disk drive 24. Host 22 includes a central processing unit (CPU) 26 coupled to a memory 28 and a host input/output (I/O) interface 30. Memory 28 includes enhanced file system software 32. File system software 32 includes instructions executed by CPU 26 in order to implement a file system using disk drive(s) 24. File system software 32 may be included within operating system software.

Disk drive(s) 24 includes a head/disk assembly 38. Head/disk assembly 38 includes one or more disk-shaped platters coated with a layer of a magnetic material, and one or more read/write heads (i.e., "heads") positioned adjacent to surfaces of the platters. During operation of head/disk assembly 38, the one or more platters are rotated about an axis, and the one or more heads transform electrical signals to magnetic signals during write operations, and transform magnetic signals to electrical signals during read operations.

The system of FIG. 2 also includes a drive controller 34 coupled between host I/O interface 30 and head/disk assembly 38. Drive controller 34 includes a disk map cache 36. As described in detail below, disk map cache 36 is used to store information indicating currently unused or "free" regions of disk drive 24 where data may be stored. The information stored in disk map cache 36 preferably identifies "free" regions near a current positions of the heads of head/disk assembly 38.

As in conventional systems, file system software 32 maintains information as to whether each region (e.g., data block, sector, etc.) of disk drive 24 is currently in use or "free". In addition, file system software 32 is enhanced to issue "WRITE ANYWHERE" commands which do not specify the "free" regions where write data is to be stored. When drive controller 34 receives a WRITE ANYWHERE command, drive controller 34 may select one or more of the "free" regions using the information stored in disk map cache 36.

By virtue of being closer to disk drive 24 than file system software 32, drive controller 34 is able to maintain and/or obtain much more accurate information regarding the positions of the heads in head/disk assembly 38. In some embodiments, drive controller 34 may keep track of the positions of the heads in head/disk assembly 38 (e.g., based upon previous commands issued to disk drive 24). In other embodiments, drive controller 34 may receive head position information from head/disk assembly 38 of disk drive 24. In either situation, drive controller 34 may select one or more of the "free" regions of disk drive 24 dependent upon the head position information in order that the data may be stored within disk drive 24 as quickly as possible. For example, drive controller 34 may use the head position information to access the information in disk map cache 36 in order to select one or more of the "free" regions nearest the current positions of the heads.

During or following the write operation, drive controller 34 updates the information stored in disk map cache 36 to reflect that the one or more selected regions are now "in use" and no longer "free". A non-volatile free region map may be updated on the disk or in non-volatile memory. Drive controller 34 also provides information to file system 32 indicating the one or more selected regions where the data was stored. File system software 32 uses the information from drive controller 34 to update its internal disk drive region usage information. As drive controller 34 writes to "free" regions near the current positions of the heads of disk drive 24, the amount of time required to store the data within disk drive 24 using the WRITE ANYWHERE command may be reduced over a standard WRITE command, resulting in increased performance of the system of FIG. 2.

In some embodiments, drive controller 34 may be part of a storage interface of host 22. In other embodiments, drive controller 34 may be part of a controller of disk drive 24. It is noted that when drive controller 34 is part of disk drive 24, the WRITE ANYWHERE functionality described above is performed within disk drive 24. In still other embodiments, drive controller 34 may be part of a storage controller separate from both host 22 and disk drive 24. For example, drive controller 34 may be part of a redundant array of independent disks (RAID) controller in a storage system separate from host 22.

Host I/O interface 30 provides an I/O interface for host 22 (e.g., according to an interface standard). For example, host I/O interface 30 may provide a peripheral component interconnect (PCI) interface between host 22 and drive controller 34. Alternately, host I/O interface 30 may provide a switched I/O interface between host 22 and drive controller 34 according to the InfiniBand architecture.

Disk drive 24 may include, for example, an AT Attachment (ATA) interface, a small computer systems interface (SCSI) interface, or a fibre channel interface. It is noted that the terms ATA and intelligent/integrated drive electronics (IDE) are often used interchangeably. Drive controller 34 may, for example, receive PCI or InfiniBand signals generated by host I/O interface 30 and directed to disk drive 24, translate the signals into corresponding ATA, SCSI, or fibre channel signals, and provide the ATA, SCSI, or fibre channel signals to disk drive 24. Drive controller 34 may also receive ATA, SCSI, or fibre channel signals generated by disk drive 24 and directed to host I/O interface 30, translate the signals into PCI or InfiniBand signals, and provide the PCI or InfiniBand signals to host I/O interface 30.

Figure 3:
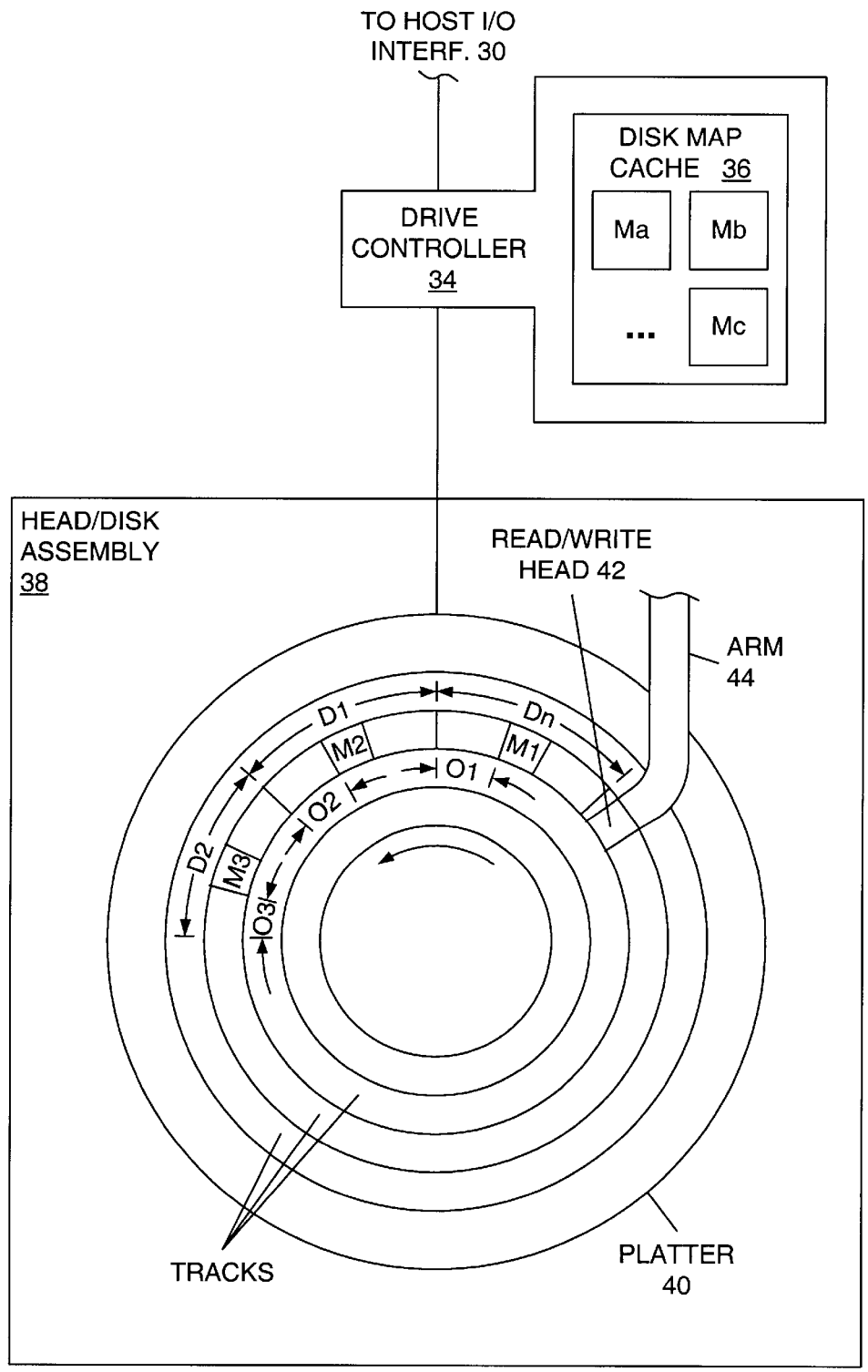
FIG. 3 is a diagram of one embodiment of the drive controller and the head/disk assembly of the system of FIG. 2, wherein the head/disk assembly includes a platter, and wherein the platter includes a representative track, and wherein the representative track includes n data regions and n corresponding disk maps (i.e., "maps")

FIG. 3 is a diagram of one embodiment of drive controller 34 and head/disk assembly 38 of the system of FIG. 2. In the embodiment of FIG. 3, head/disk assembly 38 includes a representative platter 40 and a read/write head (i.e., "head") 42 positioned adjacent to a surface of platter 40. Head 42 is attached to an end of arm 44. The surface of platter 40 is coated with a layer of a magnetic material. During operation of head/disk assembly 38, platter 40 is rotated about an axis as indicated in FIG. 3, and a thin layer of air formed between head 42 and platter 40 may separate head 42 from the surface of platter 40. Although only one platter 40, head 42, arm 44 etc. is illustrated a drive may include multiple vertically stacked platters with head/arm assemblies for one or both sides of each platter.

As shown in FIG. 3, platter 40 is divided into multiple tracks arranged as concentric rings. Each track is divided into sectors. FIG. 3 illustrates an exemplary layout of a representative track of platter 40. The representative track is divided into n data regions "D1" through "Dn". As described below, each data region includes a number of disk blocks, and each disk block includes one or more contiguous sectors. Disk maps (i.e., "maps") labeled "M1" through "Mn" are used to indicate whether each disk block of corresponding data regions "D1" through "Dn" are currently in use or "free". The maps are stored in map regions, where the map regions are located within data regions.

In one embodiment, data regions and corresponding maps are both written during the same disk rotation. In the embodiment of FIG. 3, the data region is positioned some distance ahead of the corresponding map region. Each data region "Dx" is separated from the corresponding map "Mx" by a fixed offset distance "Ox", where $1 \leq x \leq n$. The offset distance provides a sufficient amount of time between a first "data" write to write data within a data region and a second "map update" write to update the corresponding map during the same disk rotation. The fixed offset distance is therefore dependent upon the amount of time required to issue and execute back-to-back writes. For example, the offset distance may be the distance the disk travels in the amount of time drive controller 34 requires in the worst case to fully prepare for the map update write following completion of the data write.

In FIG. 3, map "M1" is located in a map region within data region "Dn", and offset "O1" exists between map "M1" and corresponding data region "D1". Map "M2" is located in a map region within data region "D1", and offset "O2" exists between map "M2" and corresponding data region "D2". Map "M3" is located in a map region within data region "D2", and offset "O3" exists between map "M3" and a corresponding data region "D3" (not shown).

In the embodiment of FIG. 3, disk map cache 36 of drive controller 34 is used to store copies of a portion of the maps on each surface of each platter of disk drive 24. For example, with reference to platter 40, the cached portion of the maps may include all of the maps on the track above which head 42 is currently positioned (i.e., the current track). Alternately, or in addition, the cached portion of the maps may include all of the maps on a number of tracks adjacent to the current track and/or cylinder. In FIG. 3, map cache 36 includes maps labeled "Ma", "Mb", and "Mc", where maps "Ma", "Mb", and "Mc" may be associated with the representative track and/or the current position of head 42. In this situation, maps "Ma", "Mb", and "Mc" are copies of a portion of the maps "M1" through "Mn".

As described above, drive controller 34 either maintains or receives information indicating the current positions of the heads of disk drive 24. In response to a WRITE ANYWHERE command from file system software 32 directed to disk drive 24, drive controller 34 searches the maps within disk map cache 36 to select one or more "free" disk blocks of disk drive 24. Drive controller 34 uses the head position information from head/disk assembly 38 to select maps corresponding to data regions ahead of the heads of disk drive 24, and checks these maps for "free" data blocks. The candidate data regions are preferably sufficiently ahead of the heads to allow enough time to switch tracks and/or heads, if necessary, and to prepare for the write. Drive controller 34 selects one or more "free" disk blocks in one or more data regions sufficiently ahead of the heads.

As described above, drive controller 34 issues the data write to disk drive 24 to write the data to the one or more "free" disk blocks. Drive controller 34 then issues the map update write to disk drive 24 to update the map corresponding to the data regions including the selected disk blocks. Drive controller 34 updates the information stored in disk map cache 36 to reflect that the one or more selected regions are now "in use" and no longer "free".

Drive controller 34 reports the WRITE ANYWHERE command as complete to file system software 32 only when both the data region and the map have been written (i.e., updated). As described above, the data region and the corresponding map are preferably both written during the same disk rotation. As part of the WRITE ANYWHERE command, drive controller 34 provides information to file system 32 indicating the selected "free" disk block where the data was stored. File system software 32 uses the information from drive controller 34 to update its internal disk block usage information. As drive controller 34 writes to regions near the current positions of the heads of disk drive 24, the time required to store the data within disk drive 24 using the WRITE ANYWHERE command may be reduced over a standard WRITE command, resulting in increased performance of the system.

Figure 4:
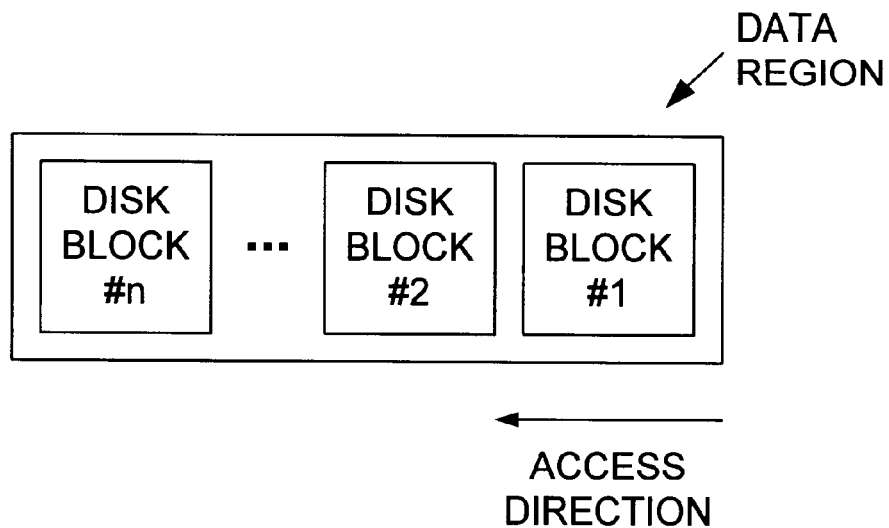
FIG. 4 is a diagram of one embodiment of a representative one of the n data regions of the representative track of the platter of FIG. 3.

FIG. 4 is a diagram of one embodiment of a representative one of the n data regions of the representative track of platter 40 of FIG. 3. The representative data region includes n disk blocks number from 1 to n. As described above, each disk block includes one or more contiguous sectors of the track of platter 40.

Figure 5:
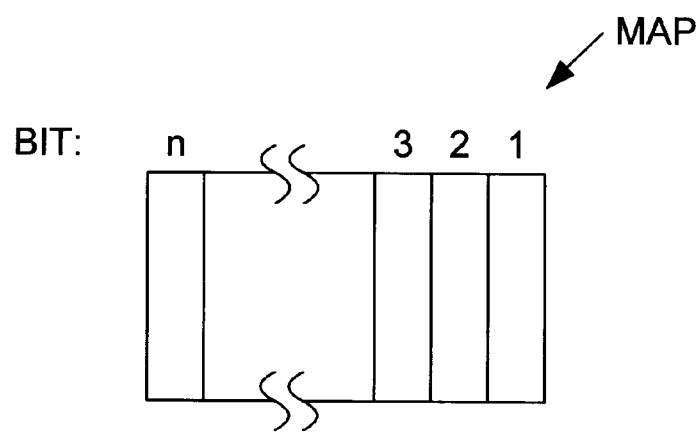
FIG. 5 is a diagram of one embodiment of a map corresponding to the representative data region of FIG. 4.

FIG. 5 is a diagram of one embodiment of a map corresponding to the representative data region of FIG. 4. As indicated in FIG. 5, the map is an n-bit vector having n bit positions, wherein each of the n bit positions corresponds to a different one of the n disk blocks of the representative data region. Each of the n bit positions stores a bit indicative of whether the corresponding disk block is in use or "free". For example, a bit in a given bit position may be a 1 if the disk block is in use, and a 0 if the disk block is "free".

Drive controller 34 may also support standard WRITE commands issued by file system software 32. The disk block usage information maintained by file system software 32 also reflects "free" disk blocks, thus there is no danger of conflict between standard WRITE commands and WRITE ANYWHERE commands as long as the commands are ordered appropriately. For example, file system software 32 may not be allowed to issue a WRITE command if a previous WRITE ANYWHERE command has not yet been completed. File system software 32 may be configured to issue standard WRITE commands when deemed appropriate.

File system software 32 (FIG. 2) is also enhanced to issue "FREE" commands to drive controller 34 specifying disk blocks that can be labeled as "free". Upon receipt of a FREE command, drive controller 34 may update the maps corresponding to one or more data regions specified by the FREE command to indicate that the disk blocks are "free". The FREE command may be used, for example, when file system software 32 reclaims disk drive space.

It is noted that there is a tradeoff involving the number of maps per track. Maps occupy disk space. Fewer maps take up a smaller amount of space, but the average latency increases since the drive may need to rotate farther to reach the map region to update the map. For example, if there were only one map per track, on average each map update write would require half a rotation of platter 40. Using more maps per track improves write latency at the cost of disk space. However, the amount of space occupied by the maps is relatively small. For example, if there are 8 maps per track, and assuming an average of 400 sectors/track (a reasonable number for typical disk drives), the map space required is 8 sectors per track, or 2% of the total disk space of the average track.

It is also noted that since only one bit of map space is needed per disk block, the extra space in the sector occupied by a given map may be used for other things, like self-identifying data, checksums, etc. In the above example, there are 49 sectors per map. If the track is assumed to be evenly filled, there is a high probability of finding a free block within the current map region, even when the drive is partially filled. It is also noted that since the maps take up little space (8 sectors or 4 KB per track in the above example, where each sector includes 512 bytes), it may be feasible for drive controller 34 to cache all of the maps of the current track, the current cylinder, and/or several nearby cylinders, or even one or more entire disk drives.

Figure 6:
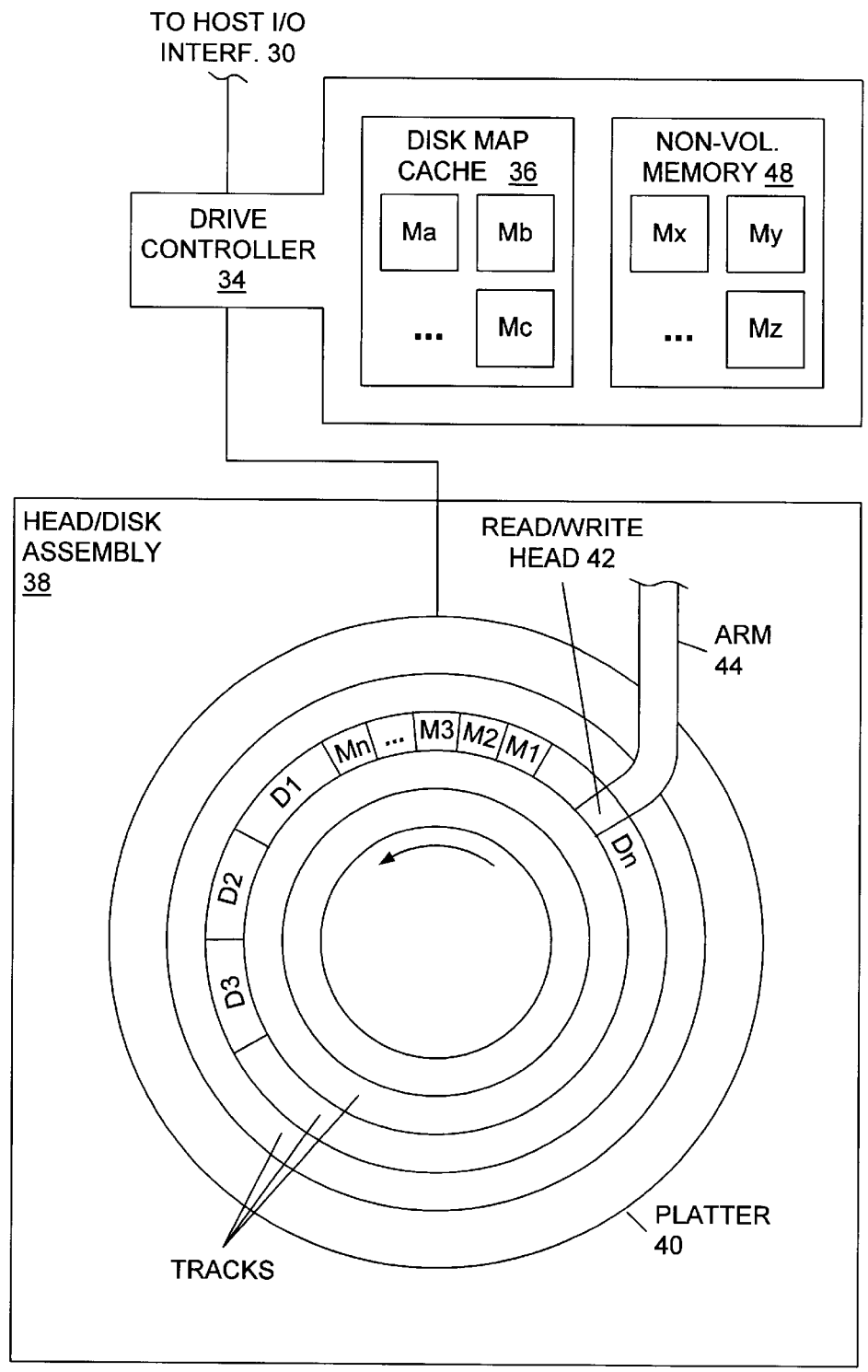
FIG. 6 is a diagram of a second embodiment of the drive controller and the head/disk assembly of the system of FIG. 2.

FIG. 6 is a diagram of a second embodiment of drive controller 34 and head/disk assembly 38 of the system of FIG. 2. In the embodiment of FIG. 6, drive controller 34 includes a non-volatile memory 48 in addition to disk map cache 36. Non-volatile memory 48 is used to store map updates such that the map update write described above, used to update maps on disk after writing to the corresponding data regions, may be omitted and/or delayed. Non-volatile memory 48 thus stores an updated portion of the maps, where the portion of the maps may include some or all of the maps. In FIG. 6, maps "Mx", "My", and "Mz" stored within nonvolatile memory 48 may be updated versions of some or all of the maps "M1" through "Mn".

In the embodiment of FIG. 6, drive controller 34 may select one or more "free" disk blocks in data regions sufficiently ahead of the heads of disk drive 24 by accessing disk map cache 36 in response to a WRITE ANYWHERE command as described above. Drive controller 34 issues a data write to disk drive 24 to write the data to the one or more "free" disk blocks. Drive controller 34 then updates the maps corresponding to the data regions including the selected disk blocks. Rather than issuing map update writes to disk drive 24 to update the maps as described above, drive controller 34 may simply store the updated maps in non-volatile memory 48 (or update existing maps in non-volatile memory 48). Drive controller may delay map update writes until times when disk drive 24 is not busy. As a result, the performance of the system of FIG. 2 may be further increased. Drive controller 34 completes the WRITE ANYWHERE command as described above.

FIG. 6 illustrates an exemplary layout of the representative track of platter 40 of FIG. 3 wherein maps "M1" through "Mn" are clustered together (i.e., located in consecutive regions) to facilitate reading and writing of the maps. Due to the inclusion of non-volatile memory 48, there is no need to have the map regions spaced by offsets from corresponding regions, since the map dates to disk can be delayed and combined. When disk drive 24 is not busy and/or when the heads are positioned above or near the representative track, disk controller 34 may issue map update writes wherein maps stored within non-volatile memory 48 are written to the corresponding map regions. Having the maps clustered together as shown in FIG. 6 reduces the number of head movements required to perform the map update writes.

It is noted that a given map needs only one bit per disk block. Thus where each disk block includes only a single sector, a map for an entire 50 GB disk may be held in 12.5 MB. On the other hand, if a disk block occupies 4 KB (8 sectors where each sector includes 512 bytes), all map information can be held in approximately 1.6 MB of memory.

Figure 7:
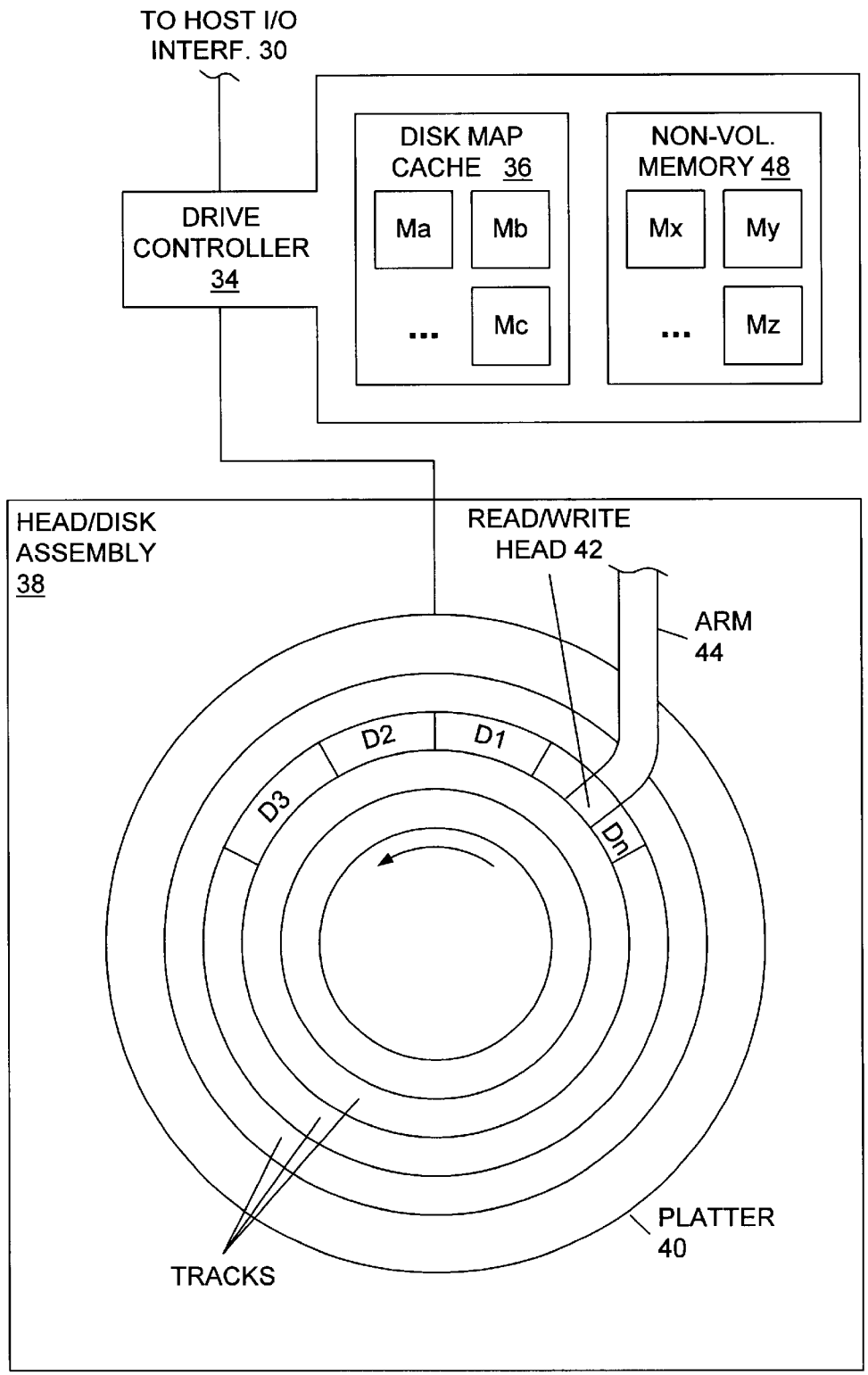
FIG. 7 is a diagram of a third embodiment of the drive controller and the head/disk assembly of the system of FIG. 2.

FIG. 7 is a diagram of a third embodiment of drive controller 34 and head/disk assembly 38 of the system of FIG. 2. As in the embodiment of FIG. 6, drive controller 34 includes a non-volatile memory 48 in addition to disk map cache 36. In the embodiment of FIG. 7, non-volatile memory 48 is used to store all of the maps corresponding to data regions of disk drive 24, thus eliminating the need to store the maps within head/disk assembly 38. In this situation, map update writes to write maps stored in non-volatile memory 48 to the platters of disk drive 24 are unnecessary, and the performance of the system of FIG. 2 may be further increased. FIG. 7 illustrates an exemplary layout of the representative track of platter 40 of FIG. 3 wherein the representative track is divided into n data regions "D1" through "Dn", and does not include corresponding maps "M1" through "Mn" which are stored in non-volatile memory 48. It is noted that the inclusion of non-volatile memory 48, where non-volatile memory 48 is used to store all of the maps corresponding to data regions of disk drive 24, eliminates the need to have map regions stored on the platters of disk drive 24. It is noted that in the embodiment of FIG. 7, maps "Mx", "My", and "Mz" stored within nonvolatile memory 48 may be portions of a single map stored within non-volatile memory 48 and corresponding to data regions of disk drive 24.

Figure 8:
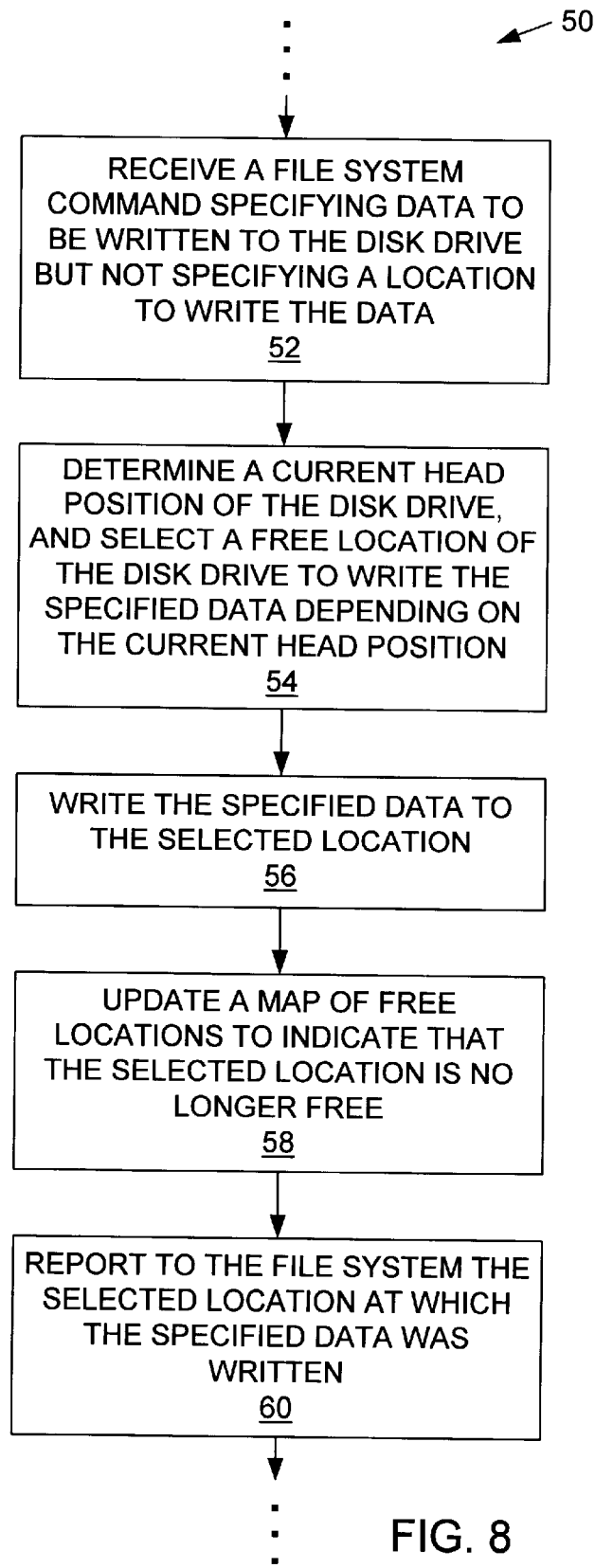
FIG. 8 is a diagram of an alternate embodiment of the drive controller and the head/disk assembly of the system of FIG. 2.

In another embodiment illustrated in FIG. 8, in which non-volatile memory 48 is used to store all of the maps corresponding to data regions of disk drive 24, a separate disk map cache may not be needed. Instead, the maps may be accessed from the non-volatile memory 48 to select one or more "free" disk blocks in data regions sufficiently ahead of the heads of disk drive 24 in response to a WRITE ANYWHERE command. The map may then be updated in the non-volatile memory 48 to reflect the write location of the data to disk.

Figure 9:
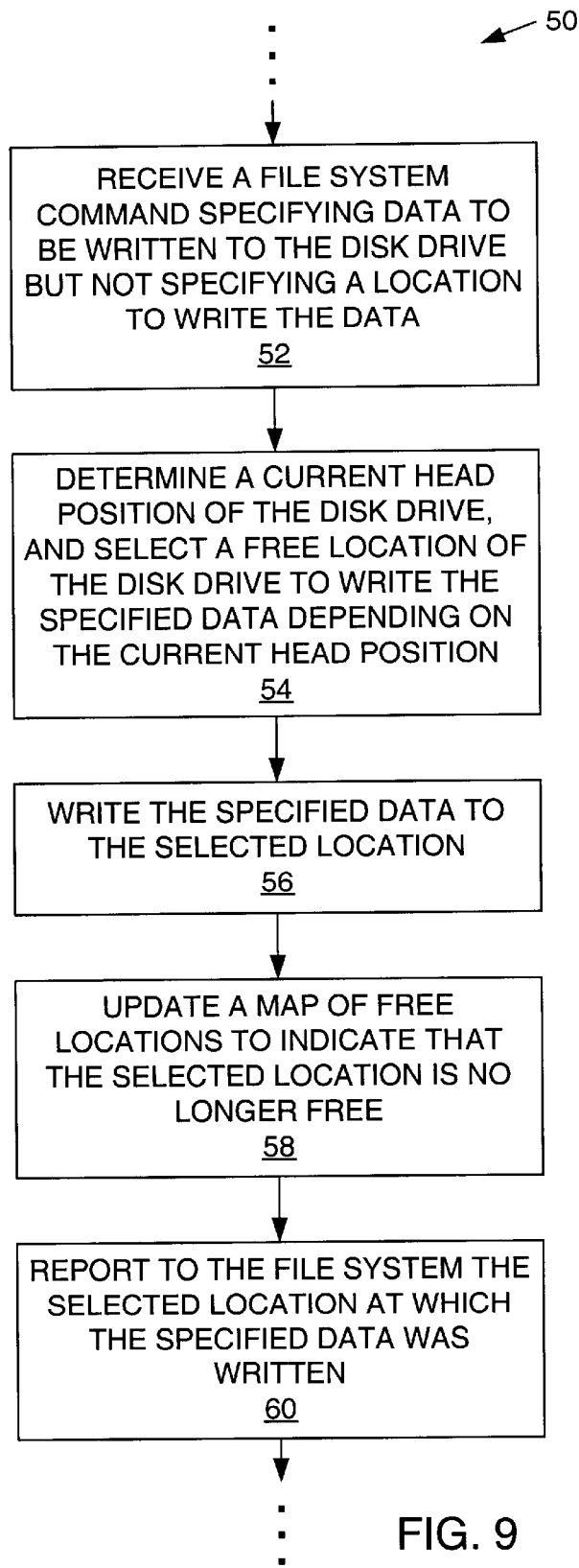
FIG. 9 is a flow chart of one embodiment of a method for writing data to a disk drive.

FIG. 9 is a flow chart of one embodiment of a method 50 for writing data to a disk drive. Method 50 is preferably embodied within drive controller 34 of FIGS. 2–3 and 6–7, and method 50 will be presented accordingly. During 52 of method 50, drive controller 34 receives a file system command (e.g., a WRITE ANYWHERE command from host 22) specifying data to be written to the disk drive, but not specifying a location to write the data. Drive controller 34 determines, during 54, a current head position of the disk drive, and selects a free location of the disk drive to write the specified data depending on the current head position. As described above, drive controller 34 either maintains or receives information indicating the current positions of the heads of the disk drive.

During 56, drive controller 34 writes the specified data to the selected location. During 58, drive controller 34 updates a map of free locations to indicate that the selected location is no longer free. During 60, drive controller reports to the file system the selected location at which the specified data was written.

It is noted that the above embodiments assume maps are positioned at fixed locations on the platters of disk drive 24. Another optimization would involve dynamically relocatable maps. Rather than having several maps per track, where each data region corresponds to exactly one map, there could be several different map areas per track, any one of which could hold a "most recent" map of any data region on the track. In this case, sequence numbers may be required to determine the most recent map after each system boot operation. The advantage of this approach is that drive controller 34 can write to the nearest map area and not have to wait for the specific map for the data region where a data block was written.

It is noted that in other embodiments of drive controller 34 and head/disk assembly 38 of the system of FIG. 2, drive controller 34 may include a single non-volatile memory performing the above described functions of both non-volatile memory 48 and disk map cache 36 (e.g., see FIG. 8).

Numerous variations and modifications will become apparent to those skilled in the art once the above disclosure is fully appreciated. It is intended that the following claims be interpreted to embrace all such variations and modifications.

What is claimed is:

1. A storage device controller configured for coupling to a storage device having a plurality of locations for storing data, wherein the controller is coupled to receive a write command including write data, and wherein the write command does not specify a location of the storage device where the write data is to be stored, and wherein the controller is configured to respond to the write command by: (i) selecting an unused location of the storage device, and (ii) writing the write data to the storage device, wherein the writing of the write data includes directing the storage device to store at least a portion of the write data in the unused location, wherein the controller is coupled to receive the write command from a host, and wherein the host is configured to track usage of the locations of the storage device, wherein the controller is coupled to receive a FREE command from the host, and wherein the FREE command specifies a location of the storage device which should be identified as unused.

2. An apparatus, comprising:
 a storage device having a plurality of locations for storing data;
 a controller coupled to the storage device;
 wherein the controller is coupled to receive a write command including write data, wherein the write command does not specify a location of the storage device where the write data is to be stored; and
 wherein the controller is configured to respond to the write command by: (i) selecting an unused location of the storage device, and (ii) writing the write data to the storage device, wherein the writing of the write data includes directing the storage device to store at least a portion of the write data in the unused location
 a host coupled to the controller and configured to produce the write command, wherein the host tracks usage of the locations for storing data of the storage device, wherein the host is configured to issue a FREE command to the controller indicating a location of the storage device which should be identified as unused.

3. An apparatus, comprising:
 a disk drive including a disk-shaped platter having a surface configured to store data, wherein the surface is divided into a plurality of different regions;
 a controller coupled to the disk drive and comprising a memory for storing data indicating unused regions of the surface of the platter;
 wherein the controller is configured to store a map on the disk-shaped platter, wherein the map indicates unused portions of the plurality of different regions, wherein said memory caches part or all of said map;
 wherein the controller is coupled to receive a write command including write data, wherein the write command does not specify a region of the surface of the platter where the write data is to be stored; and
 wherein the controller is configured to respond to the write command by: (i) selecting an unused region of the surface of the platter from the data indicating unused regions of the surface of the platter, and (ii) writing the write data to the disk drive, wherein the writing of the write data includes directing the disk drive to store at least a portion of the write data in the selected unused region of the surface of the platter.

4. The apparatus as recited in claim 3, wherein the platter is rotated about an axis during operation of the disk drive, and wherein the disk drive comprises a read/write head positioned adjacent to the surface of the platter, and wherein the read/write head is used to store data within the surface and to retrieve stored data from the surface.

5. The apparatus as recited in claim 4, wherein the controller is configured to select the unused region of the surface from the data indicating unused regions of the surface dependent upon a current position of the read/write head with respect to the rotating platter.

6. The apparatus as recited in claim 3, wherein the surface of the platter is divided into a plurality of tracks arranged as concentric rings, and wherein each track is divided into a plurality of sectors.

7. The apparatus as recited in claim 6, wherein the plurality of different regions comprises a plurality of data regions, and wherein each track includes a portion of the data regions, and wherein each data region includes a plurality of disk blocks, and wherein each disk block includes at least one sector.

8. The apparatus as recited in claim 7, wherein the plurality of different regions comprises a plurality of map regions for said map, and wherein each map region includes a disk map corresponding to a different one of the data regions, and wherein a given disk map is located on the same track as the corresponding data region, and wherein each disk map includes information indicating whether each disk block of the corresponding data region is used or unused, and wherein the map regions are located within data regions.

9. The apparatus as recited in claim 8, wherein the selected unused region of the surface specified in the writing of the write data comprises an unused disk block, and wherein a data region including the unused disk block and the corresponding disk map are both written during the same rotation of the platter.

10. The apparatus as recited in claim 9, wherein each data region is positioned a fixed offset distance rotationally ahead of the corresponding disk map.

11. The apparatus as recited in claim 10, wherein the controller writes the data region including the unused disk block and the corresponding disk map via back-to-back writes to the disk drive, and wherein the fixed offset distance is selected dependent upon an amount of time required for the controller to issue, and the disk drive to execute, the back-to-back writes to the disk drive.

12. The apparatus as recited in claim 8, wherein the memory of the controller comprises a map cache for storing copies of a portion of the disk maps stored on the surface of the platter.

13. The apparatus as recited in claim 12, wherein the controller uses the copies of the disk maps stored in the map cache to select the unused region of the surface of the platter.

14. The apparatus as recited in claim 12, wherein the map cache includes copies of the disk maps on a track of the surface of the platter adjacent to which the read/write head is currently positioned.

15. The apparatus as recited in claim 14, wherein the memory of the controller further comprises a non-volatile memory for storing updated versions of a portion of the disk maps stored on the surface of the platter.

16. The apparatus as recited in claim 15, wherein the selected unused region of the surface specified in the writing of the write data comprises an unused disk block, and wherein the disk drive writes a data region including the unused disk block in response to the writing of the write data, and wherein the controller is configured to update the disk map corresponding to the data region including the unused disk block and to store the updated version of the disk map in the non-volatile memory.

17. The apparatus as recited in claim 16, wherein the controller is configured to write the updated versions of the disk maps stored within the non-volatile memory to the disk drive.

18. The apparatus as recited in claim 13, wherein the memory of the controller further comprises a non-volatile memory for storing disk maps corresponding to all of the data regions on the surface of the platter.

19. The apparatus as recited in claim 18, wherein the selected unused region of the surface specified in the writing of the write data comprises an unused disk block, and wherein the disk drive writes a data region including the unused disk block in response to the writing of the write data, and wherein the controller is configured to update the disk map corresponding to the data region including the unused disk block within the non-volatile memory.

20. The apparatus as recited in claim 3, further comprising a host coupled to the controller and configured to produce the write command, wherein the host tracks usage of the regions for storing data of the disk drive.

21. The apparatus as recited in claim 20, wherein the host comprises:
   a central processing unit coupled to a memory and configured to execute instructions stored within the memory; and
   file system software within the memory comprising instructions for tracking usage of the regions for storing data of the disk drive.

22. The apparatus as recited in claim 20, wherein after issuing the writing of the write data to the disk drive, the controller is configured to report the region of the surface of the platter where the portion of the write data is stored to the host.

23. The apparatus as recited in claim 20, wherein the host is configured to issue a FREE command to the controller indicating a region of the surface of the platter which should be identified as unused.

24. A method for writing data to a disk drive, the method comprising:
   a drive controller receiving a file system command specifying data to be written to the disk drive but not specifying a location to write the data;
   the drive controller determining a current head position of the disk drive and selecting a free location of the disk drive to write the specified data depending on the current head position;
   the drive controller writing the specified data to the selected location;
   the drive controller updating a map of free locations to indicate that the selected location is no longer free; and
   the drive controller reporting to the file system the selected location at which the specified data was written;
   wherein said map of free locations indicates which locations on said disk drive are free for storing data, and wherein said map of free locations is distributed into map portions residing on a plurality of tracks of the disk drive, and wherein each map portion corresponds to a data region residing on the same track, and wherein each map portion is offset from the corresponding data region so that the map portion can be written in the same disk rotation as the corresponding data region, and wherein said updating comprises updating the map portion for the data region in which the selected location is located.

25. A method for writing data to a disk drive, the method comprising:
   a drive controller receiving a file system command specifying data to be written to the disk drive but not specifying a location to write the data;
   the drive controller determining a current head position of the disk drive and selecting a free location of the disk drive to write the specified data depending on the current head position;

the drive controller writing the specified data to the selected location;

the drive controller updating a map of free locations to indicate that the selected location is no longer free; and the drive controller reporting to the file system the selected location at which the specified data was written;

wherein said map of free locations indicates which locations on said disk drive are free for storing data, wherein said updating comprises the drive controller updating a portion of said map of free locations in a non-volatile memory.

26. The method as recited in claim 25, wherein said non-volatile memory is configured to store portions of said map of free locations, the method further comprising writing updated map entries in the non-volatile memory to the disk drive when the disk drive is idle or when the non-volatile memory is full.

27. The method as recited in claim 25, wherein said map of free locations for the entire disk drive is stored in said non-volatile memory.

28. The method as recited in claim 25, wherein said selecting a free location comprises the drive controller selecting the free location nearest the current head position of the disk drive with time to write the specified data.

* * * * *